Feb. 3, 1931.  H. THIRRING  1,791,389
LIGHT VALVE
Filed Oct. 19, 1929
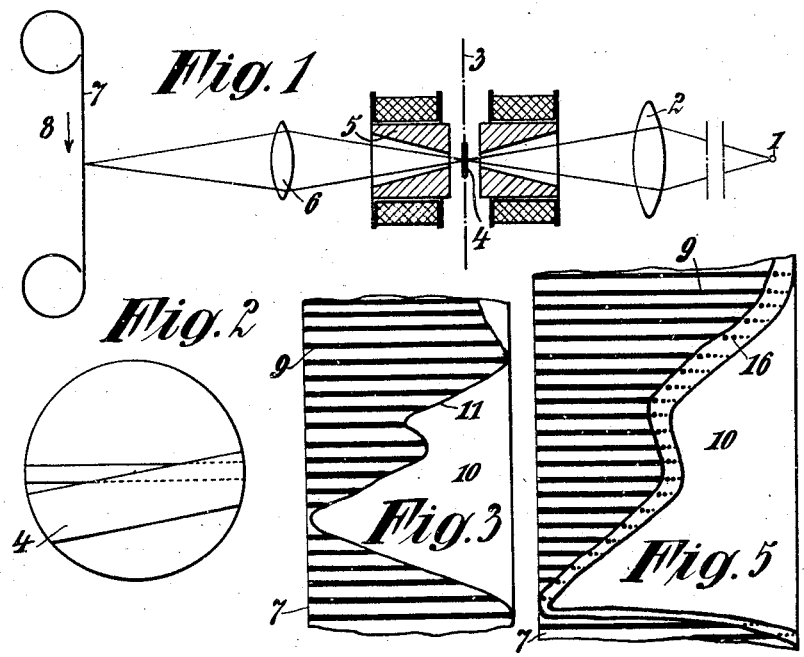
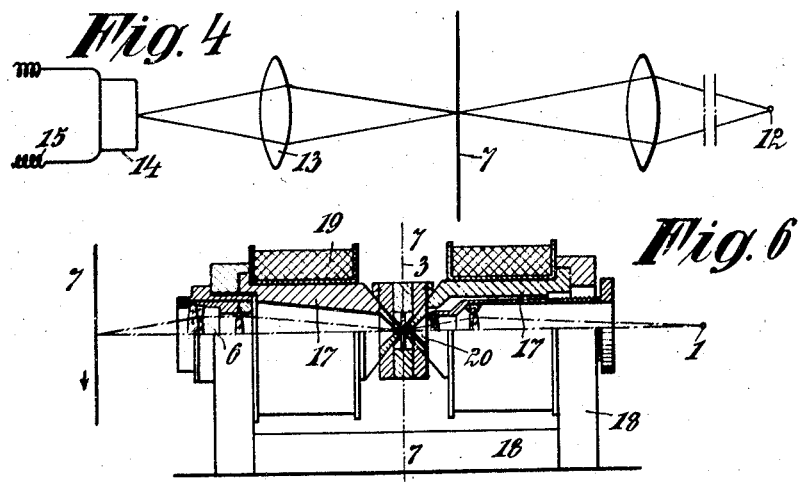
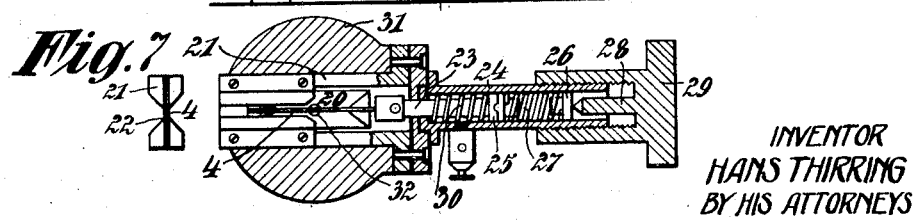
INVENTOR
HANS THIRRING
BY HIS ATTORNEYS
Howson and Howson Patented Feb. 3, 1931

1,791,389

UNITED STATES PATENT OFFICE

HANS THIRRING, OF VIENNA, AUSTRIA, ASSIGNOR TO SELENOPHON LICHT-UND TONBILDGESELLSCHAFT M. B. H., OF VIENNA, AUSTRIA, AN AUSTRIAN COMPANY

LIGHT VALVE

Application filed October 19, 1929, Serial No. 400,901, and in Austria October 25, 1928.

The invention relates to a light valve for recording alternate currents, more particularly microphone currents and the like including the manufacture of sound and talking films in which the current is caused to flow through a solid opaque conductor vibrating transversely in a substantially constant magnetic field similarly as the chord of a chord galvanometer.

The essence of the invention will be best explained by referring to the annexed drawings in which Figs. 1 to 5 are diagrammatical views for explaining the essence of the present invention; Fig. 6 is a longitudinal section of a preferred constructional form of the invention, Fig. 7 is a section on the line 7, 7 Fig. 6.

In Fig. 1, 1 is a source of light in the form of a strip perpendicular to the plane of the drawing for instance in the form of the real image of a light opening of small width or in the form of a straight filament of an electric incandescent lamp. 2 is a collective lens projecting a real and preferably reduced image of the source of light 1 onto a plane 3 in which vibrates the opaque conductor 4 in the magnetic field formed by the magnet 5 and as exactly constant as possible. A collective lens 6 projects a real image of that part of the vibrating conductors which is at any time in the real image of the source of light 1 onto a sensitized film band 7 moved at a uniform speed in a direction perpendicular to the longitudinal direction of the source of light in the plane of the drawing in the direction of the arrow 8. The vibrating conductor 4 is preferably in the shape of a strip the plane of which coincides with the plane 3 and the parts are so proportioned and arranged that in the central position of the transversely vibrating conductor 4 one of its edges passes as exactly as possible through the centre of the real image of the sources of light in the plane of vibration of the conductor, the longitudinal axes of the strip 4 of the source of light 1 and of its real image in the plane 3 being inclined to each other as shown in Fig. 2. Assuming for the sake of simplicity that the width of the real image of the source of light is negligibly small, then the strip 4 will cover successively greater and smaller parts of the real image of the sources of light 1 projected onto the plane 3 as such strip is caused to vibrate in the constant magnetic field of the magnet 5 whenever an alternate current is sent through this strip. Thereby on the sensitized band moving at a uniform speed successively longer and shorter parts of the said real image are projected by the collective lens 6. Thus on the band 7 by the usual photographic manipulations a dark zone 9, Fig. 3 extending along the band and at the side thereof a light or transparent zone 10 are obtained the two zones being separated from each other by a zigzag line 11. This zigzag line exactly represents the wave shape of the alternate current sent through the strip 4, provided the field of the magnet 5 be constant and the sensitized film band 7 be moved uniformly. In order to secure that the maximum amplitudes that may occur still fall within the width of the record provided for and determined by the length of the image of the source of light, care has to be taken that the conductor 4 at its maximum excursion in one direction just fully covers the real image of the source of light whereas at its maximum excursion in the opposite direction it fully uncovers such image. If the width of the conductor 4 were smaller one would obtain at least on some parts of the film band a dark zone between two light or transparent ones or vice versa, that is to say two lines 11. If, however, the width at the conductor were notably greater than its inertia it would be uselessly increased and the line 11 would not appear entirely on the film band. If, now as indicated in Fig. 4 the film band provided with the record of the alternate current be moved in front of a source of light 12 projecting a thin transverse line of light on the said film band and this line of light be projected by a collective lens 13 on a selenium or other cell 14 sensitive to light in a circuit 15, then as is well known, the resistance of the cell 14 will have values varying with the intensity of light radiated from the transverse line of the film band 7 just illuminated whereby the current intensity in the circuit 15 is varied. From this varying current an alternate current may be derived in any known manner not forming part of the present invention as by transformers and amplifiers, the shape of wave of which is the same as that represented by the line 11, Fig. 3.

If the alternate current recorded as above described with reference to Figs. 1 to 3 had been set up by causing waves of sound to act on a microphone, then the above mentioned current derived from the circuit 15, Fig. 4 will produce waves of sound in a telephone or loud speaker which exactly correspond to those which had been caused to act on the mircophone as above mentioned. The record above described forms in this case an acoustic or talking film.

If the width of the real image of the source of light 1 in the plane 3 be not negligibly small, then, all other things being equal in the record shown in Fig. 3 the sharp line 11 will be replaced by an intermediate zone 16, Fig. 5 of an appreciable width in which dark gradually passes into light. This interferes only slightly with the accuracy of the representation of the shape of the waves and in the case of a talking or acoustic film it does not appreciably interfere with the accuracy of the reproduction, because the total amount of light emanating from a transverse line of the film band which alone determines the reproduction is not altered at all by this intermediate zone.

The smaller the angle between the axis of the strip 4 and the real image of the source of light in the plane 3 is made, the greater will be the width of the intermediate zone 16 for a given width of the said image.

If this angle becomes zero, then neither a line 11 nor an intermediate zone will be formed, but each transverse line of the film band 7 is equally dark or light throughout but successive transverse lines are of different lightness or darkness. Thereby a sound record on the known method of variation of darkening is obtained which may be useful by itself but is open to the objection that it is less sensitive as to sound intensities but is very sensitive as to faults in developing and copying the film. If therefore it is desired to prepare the sound record in the manner above described the width of the image of the source of light must be made as small as possible. This latter condition is of importance, even apart from the reasons above mentioned, because the line of light projected onto the film band must be of very small width (of the order of .01 millimeter) in order that on recording sounds of high pitch the adjacent apices and depressions in the wave curve are not covered by the image of the line of light having too large a width.

Further, as is well known, it is necessary for an undistorted record of sounds that the natural vibration number of the conductor under tension is above the acoustically perceptible frequencies. For this reason the mass of the conductor must be as small as possible with a high tension. But as on the other hand the above mentioned condition that the conductor at its maximum excursion to one side fully covers the image of the source of light necessitaties a certain minimum width of the conductor, it is preferable, as already mentioned to make the conductor in the form of a flat strip.

Figs. 6 and 7 illustrate by way of example a constructional form of the electromagnetic part of the present recording apparatus.

The legs 17 arranged in alignment of an electromagnet and connected by a yoke 18, through the coils 19 of which a current maintained constant as nearly as possible is caused to flow, are each provided with a longitudinal bore, such bores being arranged in alignment. Outside one of the legs a source of light 1 is arranged in the form of a fine line of light perpendicular to the plane of the drawing, say a straight filament of an incandescent lamp or a linear real image of any source of light or a light opening of very small width.

A collective lens or an objective mounted in the bore of this leg projects an image on a reduced scale of the source of light onto the central plane 3 of the air gap between the pole pieces 20 of the legs 17. In the same plane 3 vibrates transversally a small strip 4 the plane of which coincides with the plane 3. A collective lens or an objective 6 arranged in the bore of the second leg 17 projects an image of the strip 4 slightly or not at all enlarged onto the film band 7 the plane of which is parallel to the linear source of light and which is moved at a uniform speed in a direction perpendicular to this source of light. On the film band is produced the image shown in Figs. 3 or 5 as above described on causing the alternate current to be recorded to flow through the strip 4. As above explained the strip 4 must be under heavy tension; therefore the magnetic field produced by the pole pieces 20 must be as powerful as possible and consequently the air gap between the pole pieces must be as small as possible. In order to maintain under these conditions the strip 4 with certainty in the plane 3 such strip 4 is mounted in a sliding frame of a non-magnetic material such as brass which consists of two parallel side parts 21 connected at one end by two rigid transverse members 22 perpendicular to the side parts 21 one end of the strip 4 being secured between the said transverse members. The other end of the strip 4 is secured to a pin 23 extending into a sleeve 24. A spring 30 interposed between an internal shoulder of this sleeve and a shoulder 25 of the said pin imparts to the strip 4 the required tension. In order to adjust this tension a second spring 27 is provided in the sleeve 24 and interposed between the shoulder 25 and a washer 26 acted upon by a stud 28 on a nut 29 screwed on the sleeve 24. Thus the spring 27 counteracts the tensioning spring 30 and this counteraction and therefore also the tension of the strip can be nicely adjusted by adjusting the nut 29. On the wedge shaped pole pieces 20 a casing 31 made of a nonmagnetic material such as brass is placed with a snug fit, which casing is provided with an opening adapted to receive and to snugly guide the side parts 21 of the sliding frame of the strip. Into this opening the sliding frame is inserted being exactly guided by the side parts 21, so that the strip 4 comes exactly into the proper position between the wedge shaped pole pieces and the small openings 32 in the same which serve for the light to pass through. Thereby a very accurate adjustment of the strip 4 relatively to the pole pieces is obtained. The casing 31 together with the pole pieces is rotatable around the axes of the legs 17 for permitting to adjust the angle between the vibrating band and the image of the source of light. A special device for locking in position the casing 31 together with the pole pieces 20 is not required since the attraction of the latter by the legs is sufficient for holding the parts in position, but if desired a locking means of any known or preferred means may be used.

Instead of a strip 4 also a wire circular in transverse section might be used but a strip is preferable on account of its smaller mass.

What I claim is:

1. In an apparatus for photographically recording alternate currents a light valve comprising an electromagnet having exciting coils energized by a substantially constant direct current, pole pieces mounted on said electromagnet opposite and in proximity to each other, said pole pieces being separated from each other by an air gap, bores in said pole pieces said bores being in alignment with each other, a non-magnetic casing surrounding said pole pieces, said casing and the pole pieces being adapted to rotate on the electromagnet around an axis coinciding with the common axis of the said bores in the pole pieces, means for projecting a real linear image of a source of light onto a plane perpendicular to the axis of the bores and passing through the air gap between the said pole pieces, an opaque linear conductor adapted to vibrate transversally in said plane and carrying the alternate current to be recorded, a sliding frame supporting said conductor and guides in the said casing for receiving and guiding said sliding frame whereby the angle between the said linear image and the conductor may be adjusted, one edge of the said vibrating conductor while in its central position passing through the centre of the said linear image.

2. In an apparatus for photographically recording alternate currents a light valve comprising an electromagnet having exciting coils energized by a substantially constant direct current, pole pieces mounted on said electromagnet opposite and in proximity to each other, said pole pieces being separated from each other by an air gap, bores in said pole pieces, said bores being in alignment with each other, a non-magnetic casing surrounding said pole pieces, said casing and the pole pieces being adapted to rotate on the electromagnet around an axis coinciding with the common axis of the said bores in the pole pieces, means for projecting a real linear image of a source of light onto a plane perpendicular to the axis of the bores and passing through the air gap between the said pole pieces, an opaque linear conductor adapted to vibrate transversally in said plane and carrying the alternate current to be recorded, a sliding frame supporting said conductor and guides in the said casing for receiving and guiding said sliding frame whereby the angle between the said linear image and the conductor may be adjusted, one edge of the said vibrating conductor while in its central position passing through the centre of the said linear image, the said sliding frame comprising two side parts, parallel and symmetrically arranged relatively to the said edge of the said vibrating conductor, guides in the said casing for the said side parts, said guides being diametrically opposite and symmetrically arranged relatively to the common axis of the said bores.

In testimony whereof I affixed my signature.

HANS THIRRING.